United States Patent [19]

Kataoka

[11] Patent Number: 5,585,686
[45] Date of Patent: Dec. 17, 1996

[54] VIBRATION TYPE ACTUATOR DEVICE

[75] Inventor: Kenichi Kataoka, Yokohama, Japan

[73] Assignee: Canon Kabushiki Kaisha, Tokyo, Japan

[21] Appl. No.: 351,034

[22] Filed: Nov. 28, 1994

Related U.S. Application Data

[63] Continuation of Ser. No. 860,603, Mar. 30, 1992, abandoned, which is a continuation of Ser. No. 600,924, Oct. 22, 1990, abandoned.

[30] Foreign Application Priority Data

Oct. 23, 1989 [JP] Japan .................................. 1-275354

[51] Int. Cl.$^6$ .............................. H01L 41/08; H02N 2/00
[52] U.S. Cl. ................. 310/341; 310/343; 310/346; 310/315; 310/323
[58] Field of Search ......................... 310/323, 341–344, 310/346

[56] References Cited

U.S. PATENT DOCUMENTS

| | | | |
|---|---|---|---|
| 2,731,564 | 1/1956 | Edelstein | 310/343 |
| 2,789,557 | 4/1957 | Davis | 310/341 |
| 3,158,928 | 12/1964 | De Prisco | 310/343 |
| 3,505,497 | 4/1970 | Lawes et al. | 219/216 |
| 3,697,890 | 10/1972 | Healey et al. | 331/116 |
| 3,801,929 | 4/1974 | Kawasaki | 331/94.5 |
| 3,989,370 | 4/1975 | Mooney | 355/14 |
| 4,007,982 | 2/1977 | Stange | 355/15 |
| 4,021,898 | 5/1977 | Willis et al. | 310/341 |
| 4,385,826 | 5/1983 | Itoh | 355/14 FU |
| 4,437,908 | 3/1984 | Inoue | 148/108 |
| 4,479,070 | 10/1984 | Frische et al. | 310/346 |
| 4,560,263 | 12/1985 | Katsuma | 354/195.1 |
| 4,663,556 | 5/1987 | Kumada | 310/333 |
| 4,692,672 | 9/1987 | Okuno | 318/116 |
| 4,746,879 | 5/1988 | Ma et al. | 331/44 |
| 4,776,070 | 10/1988 | Shibata et al. | 29/130 |
| 4,794,294 | 12/1988 | Shimizu | 310/316 |
| 4,799,378 | 1/1989 | Portman et al. | 73/54 |
| 4,833,503 | 5/1989 | Snelling | 355/259 |
| 4,853,579 | 8/1989 | Kawasaki et al. | 310/116 |
| 4,857,793 | 8/1989 | Okuno | 310/328 |
| 4,965,532 | 10/1990 | Sakurai | 310/316 |
| 4,985,655 | 1/1991 | Jensik et al. | 310/344 |
| 4,985,687 | 1/1991 | Long | 310/343 |
| 5,016,055 | 5/1991 | Pietrowski et al. | 355/273 |
| 5,026,387 | 6/1991 | Thomas | 310/316 |
| 5,041,800 | 8/1991 | Long et al. | 310/344 |
| 5,047,637 | 9/1991 | Toda | 250/306 |
| 5,063,322 | 11/1991 | Sugita et al. | 310/341 |
| 5,131,273 | 7/1992 | Tabata et al. | 73/505 |
| 5,153,745 | 10/1992 | Brandkamp et al. | 358/406 |
| 5,165,809 | 11/1992 | Takahashi et al. | 400/124 |
| 5,200,714 | 4/1993 | Hayashi | 331/66 |
| 5,244,202 | 9/1993 | Nishimoto et al. | 271/251 |

FOREIGN PATENT DOCUMENTS

| | | | |
|---|---|---|---|
| 0124250 | 10/1984 | European Pat. Off. | 310/346 |
| 1082071 | 5/1960 | Germany | 310/341 |
| 0068154 | 6/1978 | Japan | 310/341 |
| 0178618 | 10/1983 | Japan | 310/344 |
| 0191247 | 10/1969 | U.S.S.R. | 310/341 |
| 0283596 | 5/1928 | United Kingdom | 310/343 |
| 0698076 | 10/1953 | United Kingdom | 310/343 |

Primary Examiner—Thomas M. Dougherty
Attorney, Agent, or Firm—Fitzpatrick, Cella, Harper & Scinto

[57] ABSTRACT

A vibration type actuator device, and particularly a vibration type actuator device is heated for a predetermined time at the starting of the actuator device, and is operated thereafter.

9 Claims, 5 Drawing Sheets

VIBRATION TYPE ACTUATOR DEVICE

This application is a continuation of application Ser. No. 07/860,603 filed Mar. 30, 1992 now abandoned, which is a continuation of application Ser. No. 07/600,924 filed Oct. 22, 1990, both now abandoned.

BACKGROUND OF THE INVENTION

1. Field of the Invention

This invention relates to an ultrasonic actuator such as an ultrasonic motor (a vibration type motor) or the like, and more particularly to a drive control device for controlling an ultrasonic actuator so that the ultrasonic actuator can be driven in an optimum condition.

2. Related Background Art

Generally an ultrasonic actuator typified by an ultrasonic motor (a vibration type motor is such that an electromechanical energy conversion element such as a piezoelectric element or an electrostrictive element is adhesively secured to a side of an elastic member formed into a circular ring or an elliptical shape and an individual voltage is applied to the two drive phases of said element to thereby form a travelling vibration wave in said elastic member so that said elastic member and a member which is in pressure contact with said elastic member may be moved relative to each other by the travelling wave).

The elastic member is fixed, for example, to the fixed barrel side of a lens barrel and the member which is in pressure contact with the elastic member is defined as the focus ring side of a focusing lens, whereby the ultrasonic actuator can be used as a drive source for auto focusing (AF), and the elastic member is fixed to a printer body and the member which is in pressure contact with the elastic member is provided by a sheet such as paper, whereby the ultrasonic actuator can be used as a sheet feeding mechanism for feeding the sheet to the printing station of the printer. Further, the elastic member is mounted on the printer body for reciprocal movement along the widthwise direction of the sheet and a printing head is mounted on the elastic member, and the elastic member is brought into pressure contact with a rail-like stator fixed to the printer body along the direction of movement of the elastic member, whereby it can be used as a carriage mechanism for effecting the scanning of the printing head.

Also, a construction similar to the carriage mechanism can be used as a driving mechanism for a precision stage.

These mechanisms utilizing an ultrasonic actuator can directly move the elastic member and the member which is in pressure contact with this elastic member without the intermediary of a transmission mechanism such as gears and therefore is suitable for a mechanism for feeding sheets highly accurately at a predetermined pitch, such as, for example, a sheet feeding mechanism in a printer.

In the vibration wave actuator, a member moved relative to the elastic member, for example, a sheet, is in pressure contact with the elastic member and therefore, the holding torque is great during the non-application of an electric field to the drive phase of the piezo-electric element and thus, design is made such that when the sheet is intermittently fed, an electric field is applied to the drive phase during the start of the sheet feeding and that during the stoppage of the sheet feeding, a drive power source is opened to stop the application of the electric field to the drive phase.

Now, there is an advantage that, for example, the sheet can be brought to a standstill simply by opening the power source during the stoppage of the sheet fading. However, while the temperature of the ultrasonic actuator falls during the stoppage and the temperature rises for several to several tens of seconds during the re-starting and, therefore, the vibration performance (response characteristic, etc.) of the vibration member comprising the piezo-electric element, the elastic member and the adhesive agent or the like therebetween, and the torque transmission performance of a friction material vary greatly. In view of this, it has been proposed to effect high-degree control, taking the response characteristic of each temperature into account and maintaining the performance (T-N characteristic, etc.) of the actuator constant. However, in the case of such a control system, if speed control or position control is immediately effected during the start-up, the influence of the temperature of the atmosphere and the temperature distribution in the motor will not be stable, and this has led to the problem of low accuracy.

It has also been found from experiments that too low temperature of the vibration member tends to aggravate the performance (T-N characteristic, etc.) of the actuator.

SUMMARY OF THE INVENTION

One aspect of the application is to provide a drive control device for a vibration type actuator which can eliminate by a simple construction the drawback of control accuracy during start-up attributable to the temperature characteristic of a vibration member or the like and can accomplish stable and highly accurate control.

One aspect of the application is to provide a vibration type actuator device in which a driving signal is applied to an electro-mechanical energy conversion element to thereby generate vibration in a vibration member and wherein provision is made of temperature control means for controlling the temperature of said actuator to thereby render the temperature of the actuator proper from the start-up and which effects highly accurate driving.

One aspect of the application is to provide an ultrasonic actuator device which comprises a vibration member having an electro-mechanical energy conversion element secured to an elastic member, and a pressure contact member brought into pressure contact with that surface of the vibration member opposite to the surface to which the electro-mechanical energy conversion element is secured and in which an AC voltage is applied to the electro-mechanical energy conversion element to form a travelling vibration wave in the elastic member and thereby move the elastic member and the pressure contact member relative to each other and wherein provision is made of heating means for heating the vibration member or the pressure contact member to achieve the above object.

DESCRIPTION OF THE PREFERRED EMBODIMENTS

Figure 1:
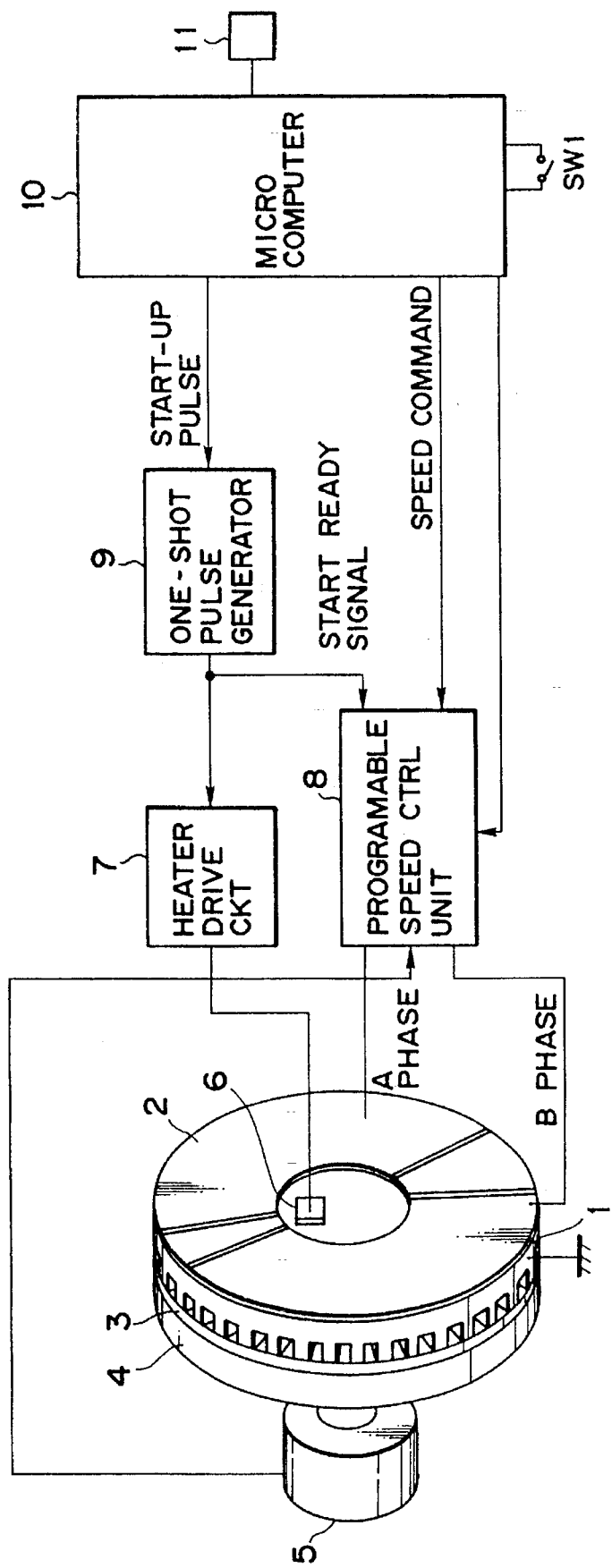
FIG. 1 is a circuit diagram showing an embodiment of a vibration type actuator device according to the present invention.
Figure 3:
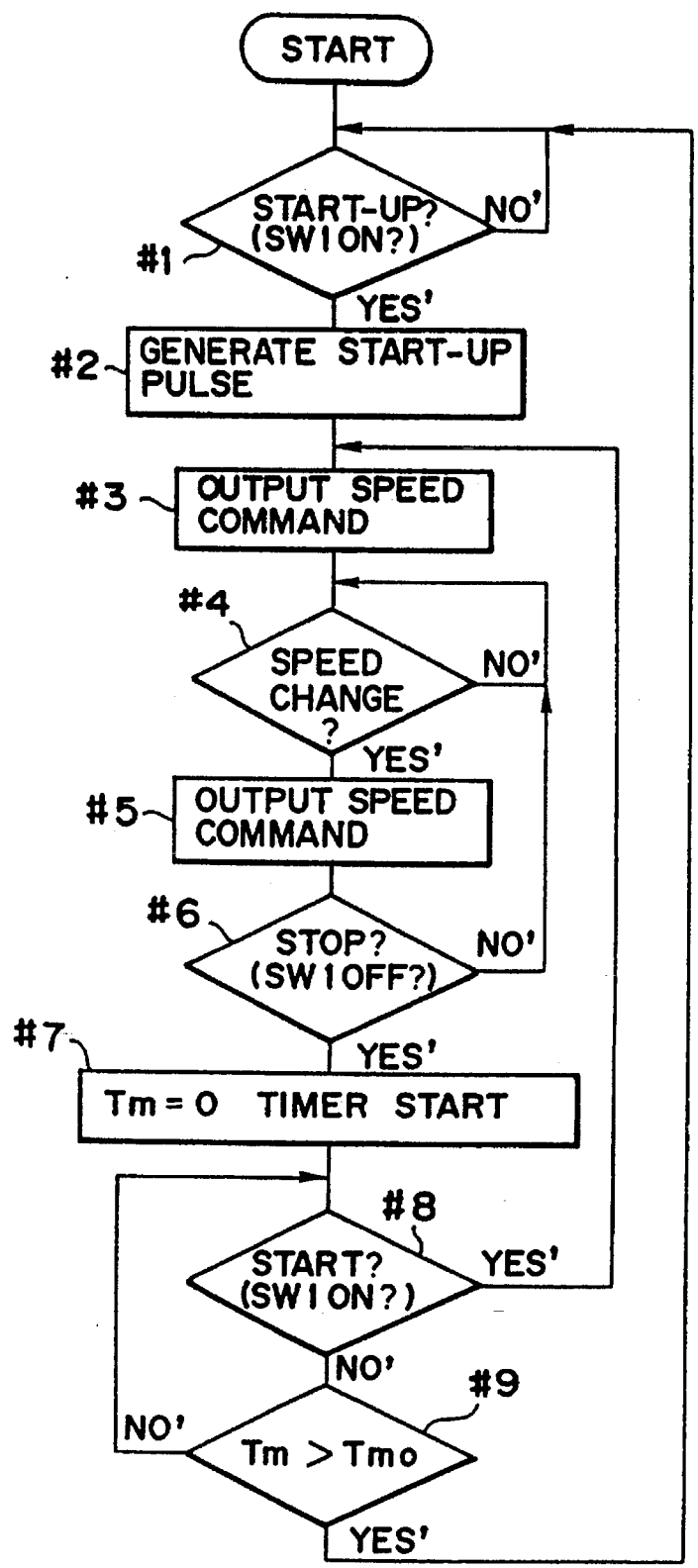
FIG. 3 is a control flow chart in a microcomputer in the FIG. 1 embodiment.

FIG. 1 is a block diagram showing a first embodiment of a drive control device for an ultrasonic actuator. The reference numeral 1 designates an disk-shaped elastic member having a projected portion formed on one surface side along the circumferential direction thereof, and the reference numeral 2 denotes an electro-mechanical energy conversion element such as a piezo-electric element or an electrostrictive element adhesively secured to the elastic member 1 and having two driving electrodes, A phase and B phase. By AC voltages of different phases being applied to the two driving electrodes, vibration (travelling vibration) is generated in the elastic member 1. The reference numeral 4 designates a rotor to which a friction member 3 is joined. The friction member 3 is in contact with the projected portion of the elastic member 1. By the elliptical motion of the projection of the elastic member 1 caused by said travelling vibration, the rotor is given a drive force in the direction opposite to the direction of travel of said travelling vibration and is rotated thereby. The reference numeral 5 denotes a rotary encoder attached to the shaft of the rotor 4, the reference numeral 6 designates a heater element joined to the elastic member 1, and the reference numeral 7 denotes a heater element driving circuit for switching on and off a voltage applied to the heater element 6 by a start ready signal which will be described later. The heater element driving circuit 7 effects the power supply (voltage application) to the heater element 6 as long as the start ready signal is produced. The reference numeral 8 designates a programmable speed control unit for varying the amplitudes and frequencies of the AC voltages applied to the driving electrodes A phase and B phase of the piezo-electric element 2 and the phase difference between A phase and B phase by the use of PLL control or the like so that the frequency of the output pulse of the rotary encoder 5 may become a frequency conforming to a speed command, and controlling the rotational speed of the rotor 4. The programmable speed control unit 8 is designed such that when the heater element 6 is in its ON state, by the start ready signal which will be described later, whatever may be the speed command which will be described later, the rotor 4 is not rotated (the phase difference between the AC voltages applied to A phase and B phase is rendered into 0° or the amplitude of at least one of the voltages applied to A phase and B phase is rendered into 0 [V]) or the rotor 4 assumes a predetermined rotational speed. The reference numeral 9 denotes a one-shot pulse generator circuit for rendering the start ready signal into its ON state for a predetermined time by a start-up pulse which will be described later to thereby render the heater element 6 into its ON state. The reference numeral 10 designates a microcomputer outputting a speed command which is a command for the rotational speed of the rotor 4 and generating the start-up pulse during the starting. The computer 10 generates a start-up pulse when the period of time from which it commands the stoppage of the rotor 4 by the speed command until the next start-up is a predetermined time or longer, but does not generate the start-up pulse and outputs the speed command if that time is within the predetermined time. The flow chart of the operation of the computer 10 is shown in FIG. 3. That is, when the closing of a switch $SW_1$ adapted to be closed in response to the operation of an operating member, not shown, is detected at #1, the computer 10 generates the start-up pulse at #2 and outputs the speed command at #3 and the start ready signal (high level signal) from the one-shot pulse generator circuit 9 assumes its ON state for a predetermined time. and During this ON state, power supply is effected to the heater element 6 by the driving circuit 7. Also, when the start ready signal becomes OFF, the power supply to the heater element 6 by the driving circuit 7 is stopped and the rotor 4 rotates at a rotational speed conforming to the speed command. It is to be understood that speed information is set by an encoder 11 operatively associated with a dial, not shown, to set a digital value and the computer 10 monitors this set speed information and outputs a speed command of a value conforming to the set speed information.

Figure 4:
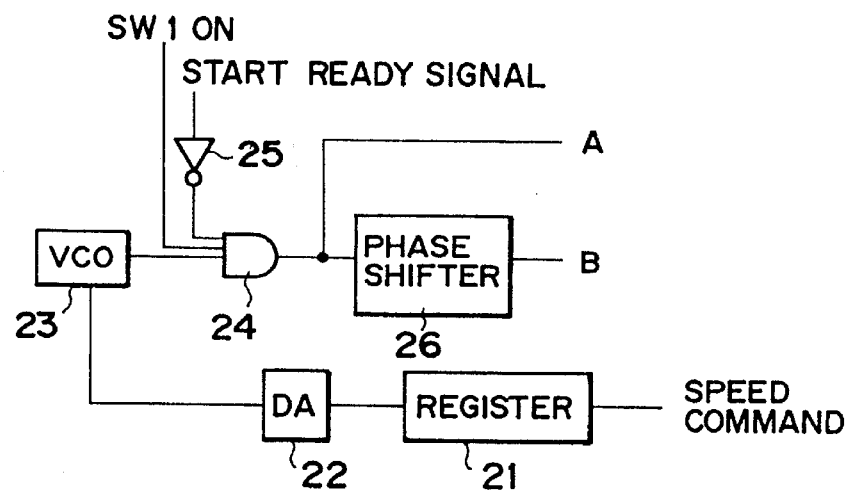
FIGS. 4, 5 and 6 are circuit diagrams showing embodiments of the speed control unit shown in FIG. 1.

Referring now to FIG. 4 which is a block diagram showing an example of the speed control unit 8, the reference numeral 21 designates a register for inputting the speed command (digital value). The reference numeral 22 denotes a DA converter for converting the digital value of the register 21 into an analog value. The reference numeral 23 designates a voltage control oscillator outputting a pulse of a frequency conforming to the output level of the converter 22, the reference numeral 24 denotes an AND gate, the reference numeral 25 designates an inverter, and the reference numeral 26 denotes a phase shifter for shifting the phase of the pulse passed through the gate 24 by 90°. In the above-described construction, the start ready signal is input to the input of the inverter 25, and as long as this signal is at a high level, the gate 24 becomes OFF and the driving signal is not applied to the A phase and B phase electrodes and the rotor is in its stopped state. On the other hand, the start ready signal becomes OFF (low level signal), whereby the gate 24 becomes open. On the other hand, the set speed command is input to the register 21, and an analog signal conforming to the set speed is output from the converter 22. Consequently, the oscillator 23 outputs a pulse of a frequency corresponding to the output of the converter 22, i.e., the set speed information, applies this pulse to the A phase electrode and phase-shifts this pulse by 90° by the shifter 26 and transmits it to the B phase electrode. Consequently, when the power supply to the heater element 6 is discontinued, the rotor 4 rotates at the set speed. When the speed information from the encoder 11 is thereafter changed, this is detected at #4 (FIG. 3) and a speed command corresponding to the changed speed information is output at #5, and the rotor rotates at the set speed. At #6, the ON or OFF of the switch $SW_1$ is again detected, and if the switch $SW_1$ is ON, return is made to #4, where as described above, the rotor 4 is rotated at the set speed. On the other hand, if at #6, the OFF of the switch $SW_1$ is detected, advance is made to #7. At this time, the ON signal (high level) of the switch $SW_1$ is not input to the gate 24 of FIG. 4 and therefore, the gate 24 becomes OFF and the rotor 4 is stopped. At #7, the counting by a timer in the computer is started. At #8, the ON or OFF of the switch $SW_1$ is detected, and if the switch $SW_1$ is OFF, advance is made to #9, where it is determined whether the counted time Tm by the timer is longer than a predetermined time Tmo and if Tmo≧Tm, that is, if Tm is within the time Tmo from which the rotor was stopped, return is made to #8. Consequently, when the switch $SW_1$ becomes ON, that is a re-starting operation is effected, within the time Tmo from which the rotor 4 is stopped, advance is immediately made to #3, where the driving signal is applied to the A phase and B phase electrodes and the rotor 4 is again rotated. On the other hand, when Tm>Tmo, advance is made to #1. Consequently, when the switch $SW_1$ becomes ON thereafter to effect the re-starting, the rotor 4 starts to rotate again after the power supply to the heater element is effected for a predetermined time. Thereby the temperature of the resilient member during the driving can be kept substantially constant and highly accurate control becomes possible. Also, although in the present embodiment a heater element is employed, the heater element need not always be joined to the elastic member 1. The elastic member may be warmed, for example, by a warm air fan or the like.

While the above embodiment has been shown as an example in which the rotation of the rotor 4 is inhibited during the power supply to the heater element 6, the rotor 4 may be rotated at a predetermined speed (a low speed) independent of the set speed during the power supply to the heater element 6.

Figure 5:
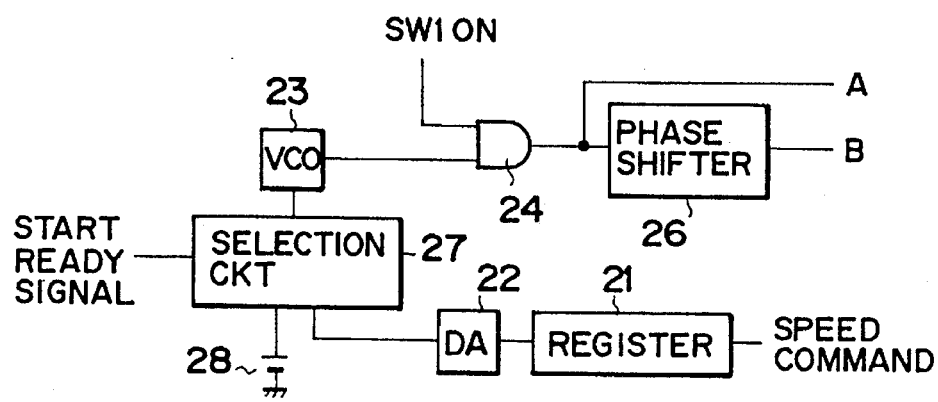

In this case, the speed control circuit 8 is constructed as shown in FIG. 5. In FIG. 5, members identical to those in FIG. 4 are given identical reference numerals.

In FIG. 5, the reference numeral 27 designates a selection circuit designed to transmit the output of a constant voltage source 28 to the oscillator 23 as long as said start ready signal (high level) is input, and to transmit the output of the converter 22 to the oscillator 23 when said start ready signal becomes extinct (low level).

Also, without the heater element being provided as means for raising the temperature of the elastic member 1, the elastic member 1 may be vibrated to thereby raise the temperature thereof.

Figure 6:
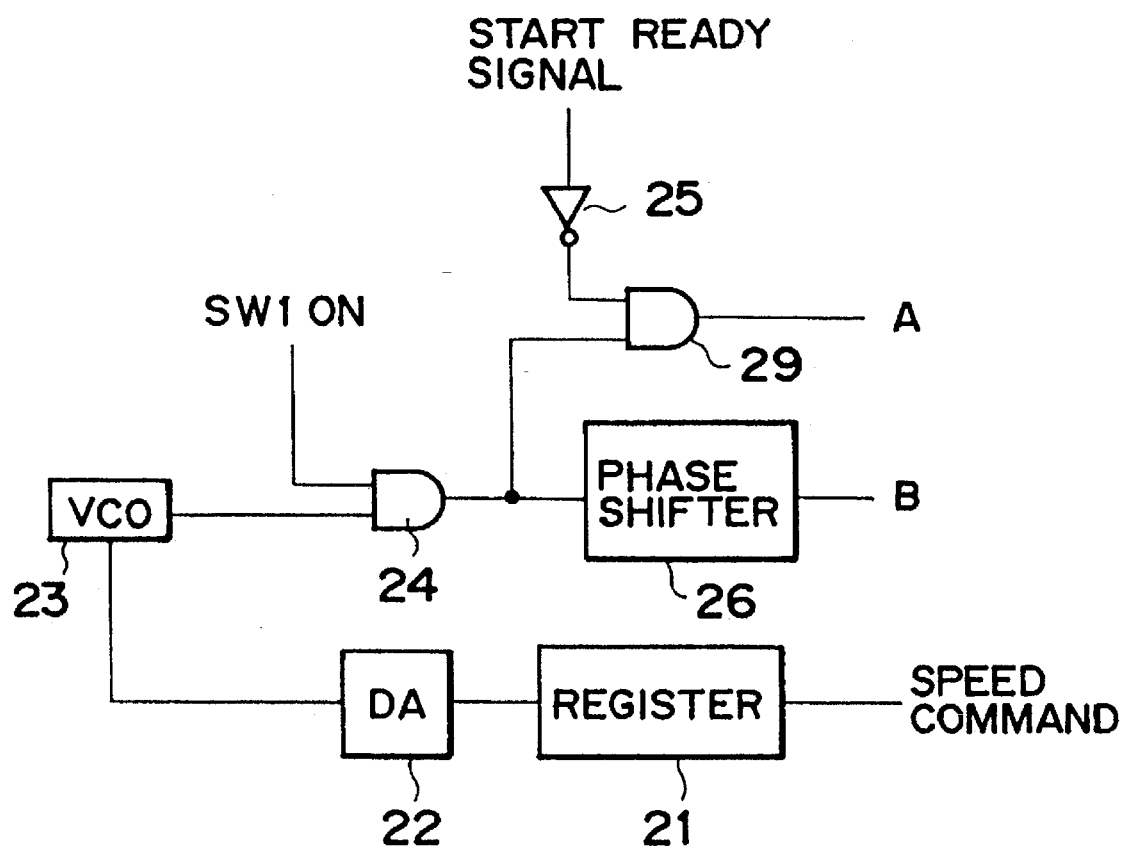

FIG. 6 is a circuit diagram showing an example of the speed control unit for vibrating the elastic member 1 to thereby raise the temperature thereof without the heater element being provided. In FIG. 6, members identical to those in the FIG. 4 embodiment are given identical reference numerals. In FIG. 6, when the start ready signal (high level) is being produced, an AND gate 29 is closed and a driving signal is applied to only the B phase electrode to thereby form a standing wave in the vibration member and raise the temperature of the vibration member.

The heater element in the FIG. 1 embodiment may be provided on the rotor side.

In the above-described embodiment, before start-up nothing is done other than raising the temperature of the elastic member. However, where the ultrasonic motor is used for two or more uses by the use of a gear, a clutch or the like, and one of the uses requires lower accuracy relative to the other use, the use requiring lower accuracy may be driven earlier to raise the temperature of the elastic member, and then the ultrasonic motor may be used for the use requiring higher accuracy, for example, in a recording apparatus such as a printer, a copying apparatus or a stepper, for the wow flutter during the recording, the positional accuracy when shift is made from the recording operation to the recording operation, or the like.

Figure 2:
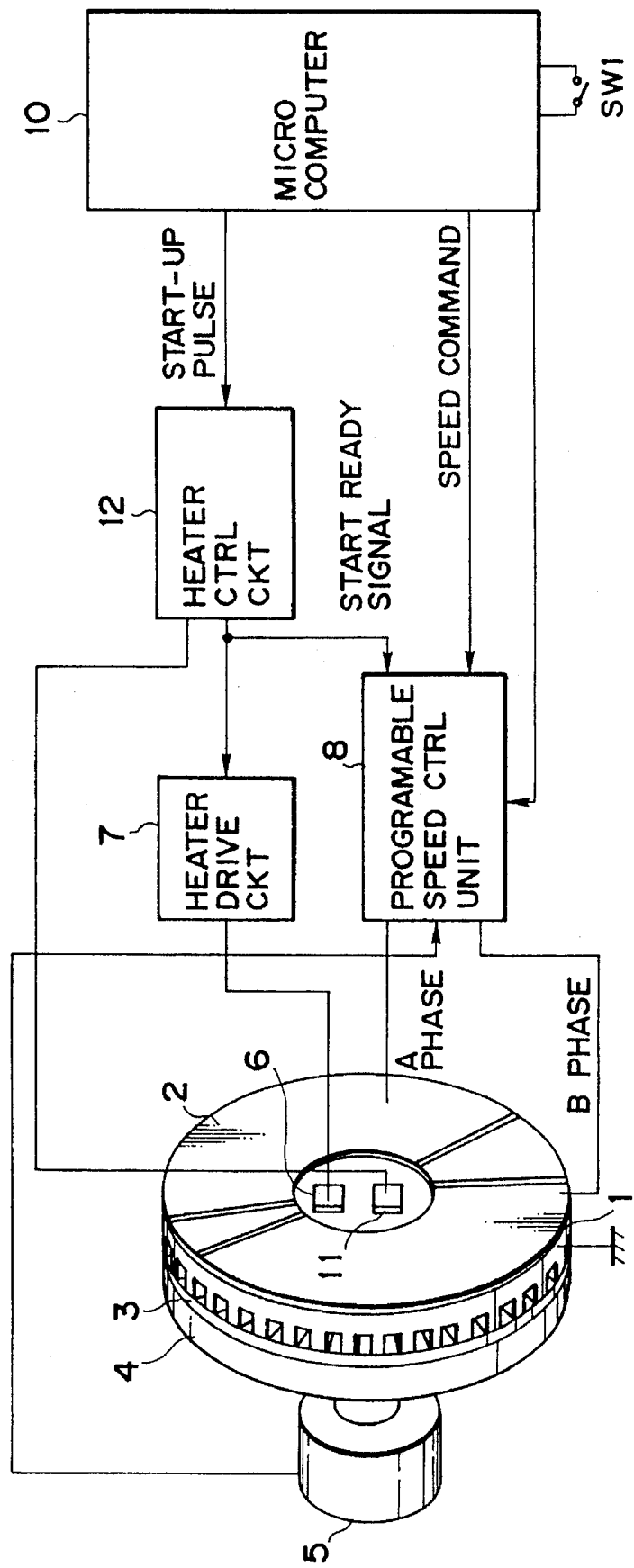
FIG. 2 is a circuit diagram showing another embodiment of the actuator device according to the present invention.

FIG. 2 is a block diagram of an embodiment in which a temperature sensor is joined to the elastic member 1 to detect the temperature of the elastic member 1 and the heater element 6 is maintained in its ON state until the temperature of the elastic member 1 reaches a predetermined temperature. In FIG. 2, members identical to those in the FIG. 1 embodiment are given identical reference numerals. The reference numeral 11 denotes a temperature sensor, and the reference numeral 12 designates a heater element control circuit for rendering the start ready signal into its ON state to render the heater 6 into its ON state as long as the temperature detected by the temperature sensor 11 is the predetermined temperature or below when the start-up pulse is input from the computer. That is, the ON state of the start ready signal in the FIG. 1 embodiment lasts for a predetermined time, whereas in the FIG. 2 embodiment, the ON state of the start ready signal lasts until the temperature of the elastic member 1 reaches the predetermined temperature and thus, the temperature becomes more stable.

I claim:

1. A vibration driven actuator device in which an electromechanical energy conversion element is provided on a vibration member and a driving signal is applied to said conversion element to thereby generate vibration in said vibration member and said vibration is used as a drive force for relatively driving a contact member which is in pressure contact with the vibration member, or an apparatus driven by the use of said actuator device, said actuator device or said apparatus comprising:

(a) temperature control means for varying the temperature of said actuator device; and (b) a control circuit for operating said temperature control means for a predetermined time before said actuator device is started in a start-up operation, wherein said control circuit controls said temperature control means so that said temperature control means is operative in a first start-up operation and is not operative during a subsequent start-up operation when said actuator device is again driven within a predetermined period of time after said actuator device terminates a prior driving operation.

2. A vibration driven actuator device in which an electromechanical energy conversion element is provided on a vibration member and a driving signal is applied to said conversion element to thereby generate vibration in said vibration member and a contact member being driven relative to said vibration member by the vibration of said vibration member, or an apparatus driven by the use of said actuator device, said actuator device or said apparatus comprising:

(a) temperature control means provided at said contact member for varying the temperature of said actuator device; and (b) a control circuit for operating said temperature control means for a predetermined time before said actuator device is started in a start-up operation, wherein said control circuit controls said temperature control means so that said temperature control means is operative in a first start-up operation and not operative during a subsequent start-up operation when said actuator device is again driven within a predetermined period of time after said actuator device terminates a prior driving operation.

3. A vibration type actuator device in which electromechanical energy conversion element means is provided at a vibration member and a driving signal is applied to said conversion element means to thereby generate vibration in said vibration member and said vibration is used as a drive force for relatively driving a contact member which is in pressure contact with the vibration member, or an apparatus driven by the use of said actuator device, said actuator device or said apparatus comprising:

a control circuit having a first mode in which a first driving signal is applied to said conversion element means during a temperature controlling operation of said vibration member, and a second mode in which a second driving signal is applied to said conversion elements means for a driving operation of said vibration member, wherein a second driving signal comprising first and second frequency signals having a phase difference therebetween is applied to said conversion element means in said second mode, and wherein a first driving signal comprising first and second frequency signals having the same phase or a first frequency signal is applied to said conversion element means in said first mode.

4. A vibration driven actuator device according to claim 3, wherein said control circuit operates in the first mode for a predetermined time period, and thereafter operates in the second mode.

5. A vibration driven actuator device in which electromechanical energy conversion element means is provided at a vibration member and a driving signal is applied to said conversion element means to thereby generate vibration in said vibration member and said vibration is used as a drive force for relatively driving a contact member which is in pressure contact with the vibration member, or an apparatus driven by the use of said actuator device, said actuator device or said apparatus comprising:

a control circuit operable in a first mode in which a first driving signal is applied to said conversion element means for a temperature controlling operation of said vibration member, and operable in a second mode in which a second driving signal is applied to said conversion element means for a driving operation of said vibration member, said control circuit including control means for changing from said first mode to said second mode after a predetermined operation of said first mode.

6. A vibration driven actuator device according to claim 5, wherein said control means changes the operation mode to said second mode after performing the first operation mode for a predetermined time.

7. A vibration driven actuator device in which electromechanical energy conversion element means is provided at a vibration member and a driving signal is applied to said conversion element means to thereby generate vibration in said vibration member and said vibration is used as a drive force for relatively driving a contact member which is in pressure contact with the vibration member, or an apparatus driven by the use of said actuator device, said actuator device or said apparatus comprising:

a control circuit operable in a first mode in which a driving signal is applied to said conversion element means to perform a temperature controlling operation of said vibration member, and operable in a second mode in which a driving signal is applied to said conversion element means to perform a predetermined driving operation, said control circuit including control means for changing from said first mode to said second mode after an operation of said first mode.

8. A vibration driven actuator device in which an electromechanical energy conversion element is provided and a driving signal is applied to said conversion element to thereby generate vibration and said vibration is used as a driving force for relatively driving a contact member which is in pressure contact with a vibration member, or an apparatus driven by the use of said actuator device, said actuator device or said apparatus comprising:

a driving control circuit including mode control means for controlling an operative mode of said actuator, said driving control circuit being operable in a first mode where a first driving signal for obtaining a first driving state is applied to said conversion element, and operable in a second mode where a second driving signal for obtaining a second driving state different from said first driving state is applied to said conversion element; and temperature control means, responsive to said mode control means, for varying the temperature of said actuator device, said temperature control means being operable a predetermined time before the second driving signal is applied to said conversion element in said second mode.

9. A vibration driven actuator device according to claim 8, wherein said first driving state is a driving state having a predetermined driving force.

* * * * *

UNITED STATES PATENT AND TRADEMARK OFFICE
CERTIFICATE OF CORRECTION

PATENT NO. : 5,585,686
DATED : December 17, 1996
INVENTOR(S) : KENICHI KATAOKA

It is certified that error appears in the above-indentified patent and that said Letters Patent is hereby corrected as shown below:

COLUMN 1

Line 4, "Mar. 30, 1992 now abandoned," should read --Mar. 30, 1992,--.

COLUMN 2

Line 1, "fading." should read --feeding.--.
Line 13, "the" should be deleted.

COLUMN 3

Line 63, "and" should be deleted.

COLUMN 4

Line 52, "that is" should read --that is,--.

UNITED STATES PATENT AND TRADEMARK OFFICE
CERTIFICATE OF CORRECTION

PATENT NO. : 5,585,686
DATED : December 17, 1996
INVENTOR(S) : KENICHI KATAOKA

It is certified that error appears in the above-indentified patent and that said Letters Patent is hereby corrected as shown below:

COLUMN 6

Claim 3

Line 41, "type" should read --driven--.
Line 55, "elements" should read --element--.

DRAWINGS

SHEET 1

Figure 1, "PROGRAMABLE" should read --PROGRAMMABLE--.

SHEET 2

Figure 2, "PROGRAMABLE" should read --PROGRAMMABLE--.

Signed and Sealed this

Fifteenth Day of July, 1997

Attest:

BRUCE LEHMAN

Attesting Officer

Commissioner of Patents and Trademarks